United States Patent [19]

Takatani et al.

[11] Patent Number: 5,670,576
[45] Date of Patent: Sep. 23, 1997

[54] POLYAMIDE RESIN COMPOSITION

[75] Inventors: Takayuki Takatani, Ishibashi-machi; Hiromi Ishida, Moka, both of Japan

[73] Assignee: General Electric Co., Pittsfield, Mass.

[21] Appl. No.: 616,329

[22] Filed: Mar. 11, 1996

[30] Foreign Application Priority Data

Mar. 10, 1995 [JP] Japan ................... 7-078435

[51] Int. Cl.$^6$ .................................... C08F 8/00
[52] U.S. Cl. ............. 525/132; 525/134; 525/145; 525/183; 525/184; 524/403; 524/435; 524/398
[58] Field of Search .................. 525/397, 132, 525/134, 183, 184, 145

[56] References Cited

U.S. PATENT DOCUMENTS

| | | | |
|---|---|---|---|
| 4,182,697 | 1/1980 | Schmidt et al. | 525/506 |
| 4,315,086 | 2/1982 | Ueno et al. | 525/391 |
| 4,338,421 | 7/1982 | Maruyama et al. | 525/397 |
| 4,600,741 | 7/1986 | Aycock et al. | 524/139 |
| 4,642,358 | 2/1987 | Aycock et al. | 549/245 |
| 4,654,405 | 3/1987 | Jalbert | 525/391 |
| 4,659,760 | 4/1987 | van der Meer | 524/141 |
| 4,728,693 | 3/1988 | Droscher et al. | 525/181 |
| 4,743,651 | 5/1988 | Shibuya et al. | 525/96 |
| 4,745,157 | 5/1988 | Yates, III et al. | 525/133 |
| 4,755,566 | 7/1988 | Yates, III | 525/391 |
| 4,760,115 | 7/1988 | Droescher et al. | 525/132 |
| 4,772,664 | 9/1988 | Ueda et al. | 525/397 |
| 4,792,586 | 12/1988 | Han | 525/88 |
| 4,798,865 | 1/1989 | Grant et al. | 525/149 |
| 4,822,836 | 4/1989 | Wroczynski | 524/139 |
| 4,822,837 | 4/1989 | van der Meer | 524/153 |
| 4,824,915 | 4/1989 | Aycock et al. | 525/397 |
| 4,826,933 | 5/1989 | Grant et al. | 525/397 |
| 4,839,425 | 6/1989 | Mawatari et al. | 525/66 |
| 4,857,575 | 8/1989 | van der Meer et al. | 524/398 |
| 4,859,739 | 8/1989 | Yates, III et al. | 525/397 |
| 4,866,114 | 9/1989 | Tabuitz et al. | 524/100 |
| 4,873,286 | 10/1989 | Gallucci et al. | 525/133 |
| 4,874,810 | 10/1989 | Lee, Jr. et al. | 524/505 |
| 4,877,847 | 10/1989 | Masu et al. | 525/397 |
| 4,885,334 | 12/1989 | Mayumi et al. | 525/66 |
| 4,888,397 | 12/1989 | van der Meer et al. | 525/391 |
| 4,889,889 | 12/1989 | Yates, III | 525/66 |
| 4,923,924 | 5/1990 | Grant | 525/66 |
| 4,929,675 | 5/1990 | Abe et al. | 525/66 |
| 4,957,965 | 9/1990 | Taubitz et al. | 525/66 |
| 4,960,825 | 10/1990 | van der Meer | 524/505 |
| 4,963,620 | 10/1990 | Grant et al. | 525/68 |
| 4,968,749 | 11/1990 | Shibuya et al. | 525/66 |
| 4,970,272 | 11/1990 | Gallucci | 525/397 |
| 4,981,920 | 1/1991 | Terashima et al. | 525/397 |
| 4,990,564 | 2/1991 | Taubitz et al. | 525/66 |
| 5,000,897 | 3/1991 | Chambers | 264/141 |
| 5,001,181 | 3/1991 | Takagi et al. | 524/401 |
| 5,017,652 | 5/1991 | Abe et al. | 525/66 |
| 5,017,663 | 5/1991 | Mizuno et al. | 525/397 |
| 5,019,626 | 5/1991 | Taubitz et al. | 525/66 |
| 5,026,787 | 6/1991 | Takagi et al. | 525/391 |
| 5,039,746 | 8/1991 | Neugebauer et al. | 525/152 |
| 5,041,504 | 8/1991 | Brown et al. | 525/396 |
| 5,053,458 | 10/1991 | Taubitz et al. | 525/391 |
| 5,055,494 | 10/1991 | van der Meer | 521/61 |
| 5,069,818 | 12/1991 | Aycock et al. | 525/397 |
| 5,070,151 | 12/1991 | Mizuno et al. | 525/397 |
| 5,073,596 | 12/1991 | Inoue et al. | 525/148 |
| 5,073,620 | 12/1991 | Sanada et al. | 525/68 |
| 5,084,523 | 1/1992 | Neugebauer et al. | 525/397 |
| 5,086,105 | 2/1992 | Abe et al. | 524/492 |
| 5,091,473 | 2/1992 | Arashiro et al. | 525/133 |
| 5,096,979 | 3/1992 | Brown et al. | 525/396 |
| 5,109,052 | 4/1992 | Kasai et al. | 524/505 |
| 5,112,907 | 5/1992 | Nishio et al. | 525/64 |

(List continued on next page.)

FOREIGN PATENT DOCUMENTS

| | | |
|---|---|---|
| 0-147-874-B1 | 7/1985 | European Pat. Off. |
| 0-221-341-B1 | 5/1987 | European Pat. Off. |
| 0-222-129-B1 | 5/1987 | European Pat. Off. |
| 0-234-063-B1 | 9/1987 | European Pat. Off. |
| 0-237-187-A1 | 9/1987 | European Pat. Off. |
| 0-253-123-A1 | 1/1988 | European Pat. Off. |
| 0-292-153-A2 | 11/1988 | European Pat. Off. |
| 0-314-000-A2 | 5/1989 | European Pat. Off. |
| 0-344-590-A2 | 12/1989 | European Pat. Off. |
| 0-351-590-A2 | 1/1990 | European Pat. Off. |
| 0-362-439-A1 | 4/1990 | European Pat. Off. |
| 0-369-169-A1 | 5/1990 | European Pat. Off. |
| 0-381-390-A2 | 8/1990 | European Pat. Off. |
| 0-398-043-A3 | 11/1990 | European Pat. Off. |
| 0-400-418-A1 | 12/1990 | European Pat. Off. |
| 0-436-136-A1 | 7/1991 | European Pat. Off. |
| 0-451-563-A2 | 10/1991 | European Pat. Off. |
| 0-452-783-A2 | 10/1991 | European Pat. Off. |
| 0-491-187-A1 | 6/1992 | European Pat. Off. |
| 0-501-175-A1 | 9/1992 | European Pat. Off. |
| 0-506-386-A2 | 9/1992 | European Pat. Off. |
| 0-516-150-A1 | 12/1992 | European Pat. Off. |
| 0-550-206-A2 | 12/1992 | European Pat. Off. |
| 0-523-368-A1 | 1/1993 | European Pat. Off. |
| 0-528-581-A1 | 2/1993 | European Pat. Off. |
| 0-559-485-A1 | 3/1993 | European Pat. Off. |
| 0-549-268-A2 | 6/1993 | European Pat. Off. |
| 597648-A1 | 5/1994 | European Pat. Off. |
| 3-185055 | 8/1991 | Japan . |
| 4-39354 | 2/1992 | Japan . |
| 4-88058 | 3/1992 | Japan . |
| 4-198354 | 7/1992 | Japan . |
| 4-202256 | 7/1992 | Japan . |
| WO88/06167 | 8/1988 | WIPO . |
| WO9313251 | 7/1993 | WIPO . |

*Primary Examiner*—Mark D. Sweet

[57] ABSTRACT

The present invention provides a polyamide resin composition which has low water absorption and simultaneously has satisfactory combustion properties. Illustrative compositions contain 20–80 parts by weight of polyamide resin and 80–20 parts by weight of polyphenylene ether resin or a mixture of this resin and polystyrene resin, as well as 0.01–10 parts by weight of a compatibilizer, 1–50 parts by weight of an uncured phenol novolak resin, and 0–80 parts by weight of a rubber component wherein the weights of the compatibilizer, uncured phenol novolak resin and rubber component is based on a total of 100 parts by weight of polyamide and polyphenylene ether resins.

15 Claims, No Drawings

U.S. PATENT DOCUMENTS

| | | | |
|---|---|---|---|
| 5,115,010 | 5/1992 | Sakai et al. | 524/410 |
| 5,115,044 | 5/1992 | Neugebauer | 525/392 |
| 5,120,800 | 6/1992 | Tsukahara et al. | 525/390 |
| 5,120,801 | 6/1992 | Chambers | 525/397 |
| 5,122,575 | 6/1992 | White et al. | 525/397 |
| 5,124,391 | 6/1992 | Muehlbach et al. | 524/420 |
| 5,134,196 | 7/1992 | van der Meer | 524/235 |
| 5,145,904 | 9/1992 | Muehlbach et al. | 524/494 |
| 5,147,942 | 9/1992 | Abe et al. | 525/397 |
| 5,153,266 | 10/1992 | Muehlbach et al. | 525/66 |
| 5,159,008 | 10/1992 | Nishida et al. | 524/494 |
| 5,159,018 | 10/1992 | Nishio et al. | 525/132 |
| 5,159,075 | 10/1992 | Phanstiel et al. | 544/218 |
| 5,162,433 | 11/1992 | Nishio et al. | 525/66 |
| 5,162,440 | 11/1992 | Akkepeddi et al. | 525/149 |
| 5,162,447 | 11/1992 | Abe et al. | 525/390 |
| 5,166,237 | 11/1992 | Abe et al. | 524/114 |
| 5,175,211 | 12/1992 | Sanada et al. | 525/66 |
| 5,182,336 | 1/1993 | Abe et al. | 525/132 |
| 5,210,125 | 5/1993 | Pernice et al. | 524/426 |
| 5,212,256 | 5/1993 | Mizuno et al. | 525/395 |
| 5,225,270 | 7/1993 | Bhoori et al. | 428/280 |
| 5,237,002 | 8/1993 | Nishio et al. | 525/66 |
| 5,244,973 | 9/1993 | Sakazume et al. | 525/66 |
| 5,248,728 | 9/1993 | Lee, Jr. | 525/149 |
| 5,262,478 | 11/1993 | Nishio et al. | 525/68 |
| 5,266,673 | 11/1993 | Tsukahara et al. | 528/212 |
| 5,288,786 | 2/1994 | Nishio et al. | 524/451 |
| 5,296,533 | 3/1994 | Nagaoka et al. | 524/430 |
| 5,310,821 | 5/1994 | Kodaira et al. | 525/397 |
| 5,331,060 | 7/1994 | Aycock et al. | 525/397 |
| 5,336,732 | 8/1994 | Samuels | 525/397 |
| 5,378,750 | 1/1995 | Sayed et al. | 524/400 |
| 5,474,853 | 12/1995 | Watanabe et al. | 525/397 |

POLYAMIDE RESIN COMPOSITION

BACKGROUND OF THE INVENTION

1. Field of the Invention

The present invention relates to polyamide resin compositions. The compositions further comprise polyphenylene ether resins and uncured phenol novolak resins.

2. Brief Description of the Related Art

As polyamide resins (abbreviated hereinafter as PA) shows outstanding heat resistance, mold workability, etc., it is ordinarily used as a combined resin composition with polyphenylene ether resins (abbreviated hereinafter as PPE) for application in automobile components, electrical/electronic components, mechanical components, etc., and it can be expected to be used in an even broader range of fields in the future. However, due to the water-absorbing properties of PA, it has the disadvantage of showing poor dimensional stability. Moreover, PA also shows poor flame resistance, so it is ordinarily used after adding flame retardants of the phosphorus or halogen class, etc. Nevertheless, in compositions with halogen-type flame retardants added, when such compositions are melted and burned during manufacturing, hydrogen halide is produced, giving rise to concerns about toxicity and environmental problems. Moreover, phosphorus-type flame retardants are relatively inefficient, and when they are added in large amounts, they tend to cause plasticization and decomposition of the resin.

Various attempts have been made to improve the water absorption and dimensional instability of PA, such as a composition with phenoxy resin added (Japanese Laid-Open Patent No. 91-237160) and a composition with polyphenylene sulfide resin added (Japanese Laid-Open Patent No. 94-200148). However, although these resin compositions show low water absorption, they cannot simultaneously provide satisfactory flame resistance.

For this reason, the purpose of the present invention is to provide a PA resin composition which shows low water absorption and simultaneously provides satisfactory flame resistance.

SUMMARY OF THE INVENTION

The inventors of the present invention conducted thorough research on PA-type resin compositions and discovered that when uncured phenol novolak resin is added to PA-type resin/PPE-type resin, not only is moisture absorption low, but the resin also shows satisfactory flame resistance, thus arriving at the present invention.

Specifically, the present invention provides a polyamide resin composition, characterized by containing:

(A) 20–80 parts by weight of polyamide resin and (B) 80–20 parts by weight of polyphenylene ether resin or a mixture of said resin and polystyrene resin, and further containing, with respect to a total of 100 parts by weight of (A) and (B):

(C) 0.01–10 parts by weight of a compatibilizer, (D) 1–50 parts by weight of uncured phenol novolak resin, and (E) 0–80 parts by weight of rubber components.

DETAILED DESCRIPTION OF THE INVENTION

The polyamide resin which is used as component (A) in the present invention is a polyamide having as its main components aminocarboxylic acid, lactam, or diamine and dicarboxylic acid. Specific examples of these components include lactams such as epsilon-caprolactam, enantholactam, and omega-laurolactam, aminocarboxylic acids such as 11-aminoundecanoic acid and 12-aminododecanoic acid, diamines such as tetramethylenediamine, hexamethylenediamine, undecamethylenediamine, dodecamethylenediamine, 2,2,4-/2,4,4-trimethylhexamethylenediamine, 5-methylnonamethylenediamine, m-xylylenediamine, p-xylylenediamine, 1,3-bisaminomethylcyclohexane, 1,4-bisaminomethylcyclohexane, bis-p-aminocyclohexylmethane, bis-p-aminocyclohexylpropane, and isophoronediamine, and dicarboxylic acids such as adipic acid, suberic acid, azelaic acid, sebacic acid, didodecanoic acid, 1,4-cyclohexanedicarboxylic acid, 1,3-cyclohexanedicarboxylic acid, terephthalic acid, isophthalic acid, naphthalenedicarboxylic acid, and dimer acid. These components may be used either individually or in the form of mixtures of two or more types, and either polyamide homopolymers or copolymers obtained in this manner may be used in the present invention. Specific examples of the polyamides used in the present invention include polycaproamide (nylon 6), polyhexamethylene adipide (nylon 66), polyhexamethylene sebacide (nylon 610), polyundecanamide (nylon 11), polydodecanamide (nylon 12), as well as copolymers and mixtures of these polyamides. Among these substances, nylon 66 is preferred.

Any commonly known substance may be used as the PPE resin of component (B). PPE resin is a generic term, indicating, for example, the polymer shown in General Formula (I) below:

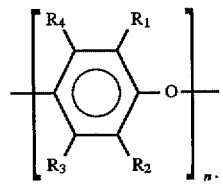

In the formula, $R_1$, $R_2$, $R_3$, and $R_4$ are independent hydrogen atoms, halogen atoms, alkyl groups, or alkoxy groups, or haloalkyl or haloalkoxy groups having at least 2 carbon atoms between the halogen atom and the phenyl ring and denote monovalent substituents selected from among substances which do not contain tertiary α-carbon, and n is an integer indicating the degree of polymerization, and the polymer shown in the above General Formula (I) may be used either alone or in the form of a copolymer consisting of a combination of 2 types or more. As a specific example, it is preferred that $R_1$ and $R_2$ be alkyl groups having 1 to 4 carbon atoms and that $P_3$ and $R_4$ be hydrogen atoms or alkyl groups having 1 to 4 carbon atoms. Examples include poly(2,6-dimethyl-1,4-phenylene) ether, poly(2,6-diethyl-1,4-phenylene) ether, poly(2-methyl-6-ethyl-1,4-phenylene) ether, poly(2-methyl-6-propyl-1,4-phenylene) ether, poly(2,6-dipropyl-1,4-phenylene) ether, poly(2-ethyl-6-propyl-1,4-phenylene) ether, etc. Poly(2,6-diethyl-1,4-phenylene) ether is particularly preferred as a PPE. Moreover, an example of a polyphenylene ether copolymer is a copolymer partially containing an alkyl-trisubstituted phenol such as 2,3,6-trimethylphenol in the polyphenylene ether repeated unit. Alternatively, these polyphenylene ethers may also be copolymers with styrene compounds grafted on. Examples of the styrene compound grafted onto the aforementioned polyphenylene ether in order to produce styrene compound grafted polyphenylene ether include copolymers obtained by graft polymerization of styrene, α-methylstyrene, vinyltoluene, and chlorostyrene.

A group of polyphenylene ethers which are particularly preferred for the present invention includes substances having a $C_1$ to $C_4$ alkyl substituent in the two ortho positions with respect to the ether oxygen molecule. Examples of this group include the following:
Poly(2,6-dimethyl-1,4-phenylene) ether;
Poly(2,6-diethyl-1,4-phenylene) ether;
Poly(2-methyl-6-ethyl-1,4-phenylene) ether;
Poly(2,6-dipropyl-1,4-phenylene) ether;
and Poly(2-ethyl-6-propyl-1,4-phenylene) ether.

In the present invention, component (B) is the aforementioned polyphenylene ether resin or a mixture of this and polystyrene (PS) resin. Examples of polystyrene resins include styrene or its derivatives, such as homopolymers and copolymers including p-methylstyrene, α-methylstyrene, α-methyl-p-methylstyrene, chlorostyrene, and bromostyrene. Moreover, one may also use a rubber modified polystyrene (HIPS) composed of 70–99% by weight of the aforementioned styrene compound and 1–30% by weight of diene rubber. Examples of the diene rubber making up HIPS include monomers of conjugated diene compounds such as butadiene, isoprene, and chloroprene, copolymers of conjugated diene compounds and unsaturated nitrile compounds or styrene compounds, as well as natural rubbers, and 1 or 2 or more of these substances may be used. Polypropylene and butadiene-styrene copolymer are particularly preferred. HIPS may be obtained by emulsion polymerization, suspension polymerization, bulk polymerization, solution polymerization, or a combination of these methods. Moreover, other examples of polystyrene resins include polystyrene thermoplastic elastomers such as styrene-acrylonitrile-acrylate copolymer, EPDM-type rubber modified polystyrene, acrylic rubber modified styrene-acrylonitrile copolymer, hydrogenated styrene-butadiene block copolymer.

PPE resin and PS resin may be blended at any desired ratio, but the usual blending ratio of these substances is 90-0 parts by weight of PS resin with respect to 10–100 parts by weight of PPE resin. One should preferably use 90-10 parts by weight of PS resin with respect to 10–90 parts by weight of PPE resin.

The above mentioned components (A) and (B) should be blended in the amount of 80-20 parts by weight of (B) with respect to 20–80 parts by weight of (A), with a ratio of 55-35 parts by weight of (B) to 65-45 parts by weight of (A) being preferred. If the amount of (A) used is too great, water absorption will increase and dimensional stability will be adversely affected, and mechanical strength will also show a tendency to decrease, and if the amount of (B) is too great, layer reversal will occur and it will be impossible to obtain the desired physical properties.

The resin composition of the present invention should contain 0.01 parts by weight or more with respect to a total of 100 parts by weight of the aforementioned components (A) and (B), with the amount of 0.1 parts by weight or more being preferred, and component C, the compatibilizer, should preferably be included in the amount of 10 parts by weight or less, and preferably 5 parts by weight or less. If the amount of the compatibilizer is too small, compatibilization of components (A) and (B) will be insufficient, leading to unsatisfactory mechanical strength, chemical resistance, and workability. On the contrary, if it is too great, die swelling will occur during manufacturing, causing major problems in processing and making it impossible to improve properties in an optimal manner.

A commonly known compatibilizer may be used together with PA and PPE as the compatibilizer of component (C).

Examples of preferred compatibilizers are listed below. First of all, the first group comprises (i) unsaturated carboxylic acid and its derivatives, such as the compounds presented in Japanese Laid-Open Patent No. 81-26913. This unsaturated carboxylic acid and its derivatives are compounds in which the molecule contains (a) carbon-carbon double bonds or triple bonds and (b) compounds containing carboxylic acid groups, acid anhydride groups, acid amide groups, imide groups, carboxylic acid ester groups, or epoxy groups. Examples of these compounds are maleic anhydride, maleic acid, fumaric acid, maleimide, maleic acid hydrazide, and reaction products of maleic anhydride and diamines, and they have structures such as that shown in the following Formulas (II):

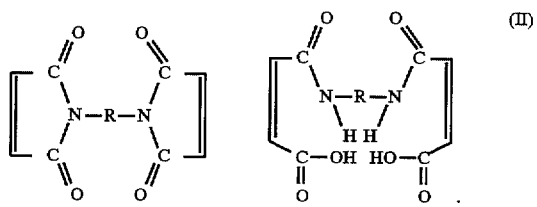

Wherein R is an aliphatic or aromatic group. Examples include methylnadic anhydride, dichloromaleic anhydride, maleamide, natural oils and fats such as soybean oil, tung oil, castor oil, linseed oil, hampseed oil, cottonseed oil, sesame oil, rapeseed oil, peanut oil, camellia oil, olive oil, palm oil, and sardine oil, epoxidized natural oils and fats such as epoxidized soybean oil, unsaturated carboxylic acids such as acrylic acid, butenoic acid, crotonic acid, vinyl acetate, methacrylic acid, pentenoic acid, angelic acid, tiburinic acid, 2-pentenoic acid, 3-pentenoic acid, α-ethylacrylic acid, β-methylcrotonic acid, 4-pentenoic acid, 2-hexenoic acid, 2-methyl-2-pentenoic acid, 3-methyl-2-pentenoic acid, α-ethylcrotonic acid, 2,2-dimethyl-3-butenoic acid, 2-heptenoic acid, 2-octenoic acid, 4-decenoic acid, 9-undecenoic acid, 10-undecenoic acid, 4-dodecenoic acid, 5-dodecenoic acid, 4-tetradecenoic acid, 9-tetradecenoic acid, 9-hexadecenoic acid, 2-octadecenoic acid, 9-octadecenoic acid, eicosenoic acid, docosenoic acid, erucic acid, tetracosenoic acid, mycolipenoic acid, 2,4-pentadienoic acid, 2,4-dodecadienoic acid, 9,12-hexadecadienoic acid, 9,12-octadecadienoic acid, hexadecatrienoic acid, linoleic acid, linolenic acid, octadecatrienoic acid, eicosadienoic acid, eicosatrienoic acid, eicosatetraenoic acid, ricinoleic acid, eleostearic acid, oleic acid, eicosapentenoic acid, erucic acid, docosadienoic acid, docosatrienoic acid, docosatetraenoic acid, docosapentenoic acid, tetracosenoic acid, hexacosenoic acid, hexacosadienoic acid, octacosenoic acid, and toraacontenic acid, or substances consisting of esters of these unsaturated carboxylic acids, acid amides, anhydrides, or low polymers such as butadiene and isoprene (such as substances having an average molecular weight of approximately 500 to 10,000) or high molecular weight polymers (such as substances having an average molecular weight of 10,000 or above with maleic anhydride or phenols added), or substances having a carboxylic acid group or epoxy group introduced.

Next, the second group of compatibilizers comprises (ii) saturated aliphatic polycarboxylic acid and its derivatives, such as the compounds presented in Japanese Laid-Open Patent No. 86-502195. In this case, the term saturated aliphatic polycarboxylic acid or its derivatives refers to a compound having the following Formula (III):

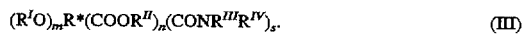

In Formula (III), R* indicates a straight-chain or branched-chain saturated aliphatic hydrocarbon group having 2 to 20 carbon atoms, and preferably 2 to 10 carbon atoms.

$R^I$ indicates a hydrogen atom or alkyl group, aryl group, or acyl group or a carbonyldioxy group (here, with 1 to 10 carbon atoms, and preferably 1 to 6 carbon atoms, with 1 to 4 being even more preferable), with a hydrogen atom being particularly preferred, $R^{II}$ indicates a hydrogen atom, an alkyl group, or an aryl group (here, having 1 to 20 carbon atoms, and preferably 1 to 10), $R^{III}$ and $R^{IV}$ indicate hydrogen atoms or alkyl or aryl groups (here, with 1 to 10 carbon atoms, and preferably 1 to 6 carbon atoms, with 1 to 4 being particularly preferred, m=1, n+s≧2, and preferably, n+s=2 or 3, n≧0, s≧0, ($R^I$O) is located at the α or β position relative to the carbonyl group, and 2 to 6 carbon atoms are present between at least 2 carbon groups.

Specific examples of the above mentioned derivatives of saturated aliphatic polycarboxylic acid include ester compounds, amide compounds, anhydrides, hydrates, salts, etc., of saturated aliphatic polycarboxylic acids.

Examples of saturated aliphatic polycarboxylic acids include citric acid, malic acid, and agaricic acid. Examples of acid ester compounds include acetic esters or mono or distearyl esters of citric acid. Examples of acid amide compounds include N,N'-diethylamides, N,N'-dipropylamides, N-phenylamides, N-dodecylamides, and N,N'-didodecylamides of citric acid and N-dodecylamides of malic acid. Examples of salts include potassium salts and calcium salts.

The third group of compatibilizers comprises (iii) compounds which sometimes have (a) a mercapto group or (b) a carboxyl group, acid anhydride group, acid amide group, imide group, or carboxylic acid ester group in the same molecule. Specific examples include mercaptopolycarboxylic acids such as thiomalic acid and thiocitric acid, compounds in which the carboxyl groups of these mercaptopolycarboxylic acids are substituted with an N,N'-dialkylamide group, an N-alkylamide group, an N-arylamide group, or an alkyl ester group, epoxy compounds such as 1,2-epoxy-3-mercaptopropane and 4-di(2,3-epoxypropyl)aminothiophenol, amines such as 1-amino-2-mercaptoethane and 4-aminothiophenol, mercapto-group-containing alcohols such as 2-mercaptoethanol and 3-mercapto-1,2-propanediol, and mercaptophenols. Mercaptopolycarboxylic acids such as thiomalic acid and thiocitric acid are particularly preferred.

The fourth group of compatibilizers comprises (iv) thiocarboxylic acid anhydrides having the Formula (IV) shown below:

$$\begin{array}{c} R^b \diagdown C = C \diagup R^a \\ \phantom{R^b \diagdown} | \phantom{= =} | \\ O = C \diagdown S \diagup C = O \end{array} \quad (IV)$$

In the above formula (IV), $R^a$ and $R^b$ are hydrogen atoms or alkyl groups, alkoxy groups, cycloalkyl groups, alkenyl groups, aryl groups, arylene groups, or alkylene groups having 1 to 12 carbon atoms), with specific examples of substances which may be used including monothiomaleic anhydride synthesized by the methods described by H. D. Scharf and M. Verbeek, Angew. Chem. Int. Ed. Engl., 6, 374 (1967) and Tamura et al. in Synthesis, 559 (1977).

The fifth group of compatibilizers comprises (v) saturated bis(acid anhydride) compounds having the Formulas (V), (VI), and (VII) shown below:

(V), (VI), (VII) structures

In the above formulas, $R^1$ to $R^6$ are independent hydrogen atoms, halogen atoms, or alkyl, alkoxy, cycloalkyl, alkenyl, aryl, arylene, or alkylene groups having 1 to 12 carbon atoms or tetracarboxylic acids selected from among those having the following Formula (VIII):

(VIII) structure

In the above Formula (VIII), $R_1$–$R^6$ are independent hydrogen atoms, halogen atoms, or alkyl, alkoxy, cycloalkyl, alkenyl, or aryl groups having 1 to 12 carbon atoms.

These compatibilizers may be used either individually or in combinations of two or more. The compatibilizer used should preferably be selected from the above groups (i) and (ii).

Next, the resin composition of the present invention also contains (D) uncured phenol novolak resin. In this case, uncured phenol novolak resin refers to a substance which, in addition to unmodified uncured phenol novolak resin (referred to in the following simply as uncured phenol novolak resin), also contains modified uncured phenol novolak resin.

Uncured phenol novolak resin is a resin having the structure shown in Formula (IX) below:

(IX) structure

In the above Formula (IX), p indicates degree of polymerization, which is ordinarily 2–10, and it is obtained by polymerization of phenols and formalin using an acid catalyst Ordinarily, substances having a molecular weight of 500–1,000, a solution viscosity of 50–300 CST (in a 50% ethanol solution), and a softening point of 95°–130° C. are preferred for the present invention.

Concerning the modified uncured phenol novolak resin of the invention, the aforementioned uncured phenol novolak resin should be modified resin of at least one of the following types: an aromatic hydrocarbon resin (such as cresol, xylenol, p-t-butylphenol, etc.), an epoxy resin, or a boric acid modified resin. Moreover, 1 to 50% by weight of the uncured phenol novolak resin should preferably be modified.

(D) The uncured phenol novolak resin should be blended in the amount of 1 part by weight or above, and preferably 2.5 parts by weight or above and 50 parts by weight or below, and preferably 20 parts by weight or below with respect to 100 parts by weight of the aforementioned component (A). If the blending ratio of (D) the uncured phenol novolak resin is too high, the thermal resistance and mechanical strength of the PA resin will decrease markedly, and if it is too low, the desired low water resistance and flame retardant effect will be impossible to obtain.

The composition of the present invention may contain (E) a rubber component, for example, in the amount of 80 parts by weight or less, and preferably 3 to 20 parts by weight with respect to a total of 100 parts by weight of components (A) and component (B) as optional ingredients.

The rubber component contains natural or synthetic polymer materials which are elastic at room temperature. Specific examples include natural rubber, butadiene polymer, styrene-isoprene copolymer, butadiene-styrene copolymer (including all types of random copolymers, block copolymers, graft copolymers, etc.), isoprene polymer, chlorobutadiene polymer, butadiene-acrylonitrile copolymer, isobutylene polymer, isobutylene-butadiene copolymer, isobutylene-isoprene copolymer, acrylic acid ester polymer, ethylene-propylene copolymer, ethylene-propylene-diene copolymer, thiokol rubber, polysulfide rubber, polyurethane rubber, polyether rubber (such as polypropylene oxide), and epichlorohydrin rubber.

These rubber components may be manufactured by any polymerization method (such as emulsion polymerization or solution polymerization) and using any desired catalyst (such as peroxide, trialkylaluminum, halogenated lithium, or a nickel catalyst). Moreover, substances having various degrees of crosslinking, substances having various proportions of microstructures (such as cis structures, trans structures, vinyl groups, etc.), or substances having varying average rubber particle diameters may be used. Furthermore, any type of copolymer, such as random copolymers, block copolymers, and graft copolymers, may be used. Also, in producing these rubber components, it is possible to use copolymers with monomers such as olefins, dienes, aromatic vinyl compounds, (meth)acrylic acid, (meth)acrylate ester, etc. Any desired method of copolymerization, such as random copolymerization, block copolymerization, or graft copolymerization, may be used. Specific examples of these monomers include ethylene, propylene, styrene, chlorostyrene, α-methylstyrene, butadiene, isobutylene, chlorobutadiene, butene, methyl acrylate, acrylic acid, ethyl acrylate, butyl acrylate, methyl methacrylate, and acrylonitrile.

Furthermore, partially modified rubber components may also be used, such as hydroxy- or carboxy-terminal modified polybutadiene, partially hydrogenated styrene-butadiene block copolymer, or partially hydrogenated styrene-isoprene block copolymer.

In the present invention, the HIPS, etc., having a styrene compound as its main component may be contained in the polystyrene resin of the aforementioned component (B) rather than the rubber component of component (E).

The composition of the present invention may also contain (F) an antioxidant or (G) a metallic salt stabilizer as optional components.

The (F) antioxidant may be any well-known substance, with examples including tetrakis [methylene-3-(dodecylthio) propionate]methane, tetrakis[methylene-3,5-di-t-butyl-4-hydroxyhydrocinnamate]methane, or n-octadecyl (3',5'-di-t-butyl-4-hydroxyphenyl)propionate; and commercial substances such as Irganox 1076 (commercial name, manufactured by Ciba-Geigy Co.), Ultranox 257 (commercial name, manufactured by General Electric Co.), Seenox 412S (commercial name, manufactured by Argus Chemical Co.), Irganox MD-1024 (commercial name, manufactured by Ciba-Geigy Co.), MARK A060 (commercial name, manufactured by Adeka Agasu Kagaku K.K.), or Hangard XL-1 (commercial name, Uniroyal Chemical Co.).

The (F) antioxidant is ordinarily contained in the amount of 5 parts by weight or less, and preferably 2 parts by weight or less, with respect to a total of 100 parts by weight of components (A) and (B).

Moreover, (G) as the metallic salt stabilizer, a metallic salt having Formula (X) below may be used:

$$M_n^{y+}X_{ny/z}^{z-}. \qquad (X)$$

In the above Formula (X), M indicates a metal selected from among copper, nickel, tin, and cerium, X is selected from among a halogen atom (Cl, Br, F, I) or a carboxylate residue such as a stearate residue ($C_{17}H_{35}COO$) or acetate residue ($CH_3COO$), n indicates an integer from 1 to 8 indicating the number of cations, ny/z indicates the number of cations, y indicates the number of cations of the metal M, and z indicates the cation charge of X.

Specific examples include $CuCl_2$, CuI (cuprous iodide), copper acetate, and cerium stearate. Among these substances, CuI is preferred. CuI is available on the market, but it may also be prepared by sedimentation or isolation of salt via a reaction of metallic copper and HI. Moreover, in the case of use of CuI, KI (potassium iodide) may be used in combination as a CuI stabilizer.

Furthermore, for example, in the presence of a halogenate ion such as KI, one may use a metallic carboxylate such as cerium stearate, and in this case, it is possible to induce the production of metal halogenates.

(G) The metallic salt stabilizer is ordinarily mixed in the amount of 5 parts by weight or less, and preferably 2 parts by weight or less, with respect to a total of 100 parts by weight of components (A) and (B). (G) the metallic salt stabilizer is effective at a concentration of approximately 200 ppm, with an amount of 0.001 arts by weight or above being more preferable.

In addition to the above mentioned components, depending on the intended use, one may also add pigments, dyes, reinforcing materials (metal fibers, metal flakes, carbon fibers, etc.), fillers (talc, carbon black, silica, titanium oxide, etc.), thermal stabilizers, optical stabilizers, ultraviolet absorbers, weatherproofing agents, lubricants, mold releasing agents, crystal nucleating agents, plasticizers, fluidity improving agents, or antistatic agents to the resin composition of the present invention. Moreover, in order to further increase the flame retardant effect, flame retardants may also be added.

There are no particular restrictions on the method used to manufacture the resin composition of the present invention, and any ordinary method may be satisfactorily used. However, the method of melt mixing is generally preferred. The use of small amounts of solvents is also possible, but this is generally unnecessary. Particular examples of the equipment which may be used include extruders, Banbury mixers, rollers, and kneaders, and these may be operated on a batch or continuous basis. There are no particular restrictions on the mixing order of the components used.

EXAMPLES

The following is a detailed explanation of the present invention by means of practical examples, but the invention is not restricted to these examples.

The following compounds were used in the practical examples.

Component (A)

PA resin: Nylon 6,6 having a relative viscosity of 2.9, a terminal amino group content of $5.5 \times 10^{-5}$ moles/g, and a terminal carboxyl group content of $7.2 \times 10^{-5}$ moles/g.

Component (B)

PPE: Poly(2,6-dimethyl-1,4-phenylene) ether having an intrinsic viscosity (chloroform, 30° C.) of 0.46 dl/g (manufactured by G.E. Plastics).

Component (C)

Citric acid

Component (D)

PN-1: Uncured phenol novolak resin (softening point 125° C., solution viscosity 250 CST, manufactured by Sumitomo as grade PR-50731)

PN-2: Boric acid-modified phenol novolak resin (uncured phenol novolak resin modified with boric acid, softening point 115° C., solution viscosity 80 CST, manufactured by Sumitomo as grade RX-53101)

Optional components (E)

SEPS: Hydrogenated styrene-isoprene block copolymer (manufactured by Kurarray as grade SEPTON 1001)

PRACTICAL EXAMPLES 1 TO 3 AND COMPARISON EXAMPLE 1

The components were mixed at the ratios shown in Table 1 (weight ratios), and using a biaxial extruder equipped with a reduced pressure vent, they were extruded as described below in order to form pellets. Specifically, extrusion was carried out in three separate stages. In the first stage, PPE, SEPS, and citric acid were blended, and the mixture was then extruded at a temperature of 300° C. to form pellets. Next, PA was uniformly blended into the pellets obtained in Step 1, and this mixture was extruded at a temperature of 280° C. to form pellets (Step 2). Next, phenol novolak resin was uniformly blended into the pellets obtained in Step 2, and this mixture was extruded at a temperature of 280° C. to make the final pellets.

These final pellets were molded in an injection molding machine set to a cylinder temperature of 280° C. and a metal mold temperature of 80° C. to make test pieces. Using the test pieces thus obtained, the following evaluation tests were conducted. The results are shown in Table 1.

(1) Flame Resistance Test

According to the combustion test for the Bulletin 94 Materials Classification of Underwriters Laboratories Corporation (UL94 test), evaluation was conducted by VB (vertical burning) (with a 1/16 inch test piece). In UL94 VB, combustion tests were conducted using 5 test pieces, and the average combustion time and presence or absence of dripping were investigated during 10 combustions.

(2) Water Absorption Ratio

An ASTM No. 1 dumbbell test specimen was immersed for 7 days in water at 85° C., and the water absorption ratio was determined by comparing weights before and after the test.

TABLE 1

| Component (parts by weight) | Practical Example 1 | Practical Example 2 | Practical Example 3 | Comparison Example 1 |
|---|---|---|---|---|
| (A) PA | 53 | 53 | 53 | 53 |
| (B) PPE | 40 | 40 | 40 | 40 |
| (C) Citric acid | 0.7 | 0.7 | 0.7 | 0.7 |
| (D) PN-1 | 5 | 10 | — | — |
| PN-2 | — | — | 10 | — |
| (E) SEBS | 7 | 7 | 7 | 7 |
| Evaluation tests | | | | |
| Combustion test (UL94 VB) Average combustion time (sec) | 20.4 | 13.5 | 10.2 | 60.5 |
| Dripping | Yes | Yes | Yes | Yes |
| Water absorption rate (%) | 3.54 | 3.07 | 3.10 | 4.25 |

As the PA resin composition of the present invention shows both low water absorption and outstanding combustion properties, it is considered to be of high practical value. Moreover, as the desired combustion properties can be obtained without using halogen-type flame retardants, the invention is also favorable because it causes little environmental pollution.

We claim:

1. A polyamide resin composition comprising:
   (A) 20–80 parts by weight of polyamide resin;
   (B) 80–20 parts by weight of polyphenylene ether resin or a mixture of said polyphenylene ether resin and polystyrene resin; and further comprising, with respect to a total of 100 parts by weight of (A) and (B),
   (C) 0.01–10 parts by weight of a compatibilizer;
   (D) 1–50 parts by weight of uncured phenol novolak resin wherein the uncured phenol novolak resin is at least partly modified by boric acid; and
   (E) 0–80 parts by weight of rubber components.

2. The resin composition of claim 1, wherein the compatibilizer is selected from among saturated aliphatic polycarboxylic acids, derivatives of saturated aliphatic polycarboxylic acids, unsaturated dicarboxylic acids, and derivatives of unsaturated dicarboxylic acids.

3. The resin composition of claim 1 further comprising an antioxidant in the amount of 5 parts by weight or less with respect to a total of 100 parts by weight of components (A) and (B).

4. The resin composition of claim 1 further comprising a metallic salt stabilizer in the amount of 5 parts by weight or less with respect to a total of 100 parts by weight of components (A) and (B).

5. The resin composition of claim 1 wherein the average combustion time is less than half the average combustion time of the same composition not containing the uncured phenol novolak resin.

6. The resin composition of claim 1 wherein the average combustion time is less than about 20.4 seconds.

7. The resin composition of claim 1 wherein the water absorption rate is at least about 16% less as compared to the same composition not containing the uncured phenol novolak resin.

8. A polyamide resin composition consisting essentially of:
   (A) 20–80 parts by weight of polyamide resin;

(B) 80-20 parts by weight of polyphenylene ether resin or a mixture of said polyphenylene ether resin and polystyrene resin; and further consisting essentially of, with respect to a total of 100 parts by weight of (A) and (B), (C) 0.01–10 parts by weight of a compatibilizer;

(D) 1–50 parts by weight of uncured phenol novolak resin wherein the uncured phenol novolak resin is at least partly modified by boric acid; and (E) 0–80 parts by weight of rubber components.

9. The resin composition of claim 8, wherein the compatibilizer is selected from among saturated aliphatic polycarboxylic acids, derivatives of saturated aliphatic polycarboxylic acids, unsaturated dicarboxylic acids, and derivatives of unsaturated dicarboxylic acids.

10. The resin composition of claim 8, wherein the uncured phenol novolak resin consists of uncured phenol novolak resin that is modified by boric acid.

11. The resin composition of claim 8, further consisting essentially of an antioxidant in the amount of 5 parts by weight or less with respect to a total of 100 parts by weight of components (A) and (B).

12. The resin composition of claim 8, further consisting essentially of a metallic salt stabilizer in the amount of 5 parts by weight or less with respect to a total of 100 parts by weight of components (A) and (B).

13. The resin composition of claim 8, wherein the average combustion time is less than half the average combustion time of the same composition not containing the uncured phenol novolak resin.

14. The resin composition of claim 8, wherein the average combustion time is less than about 20.4 seconds.

15. The resin composition of claim 8, wherein the water absorption rate is at least about 16% less as compared to the same composition not containing the uncured phenol novolak resin.

* * * * *